(12) United States Patent
Fredembach

(10) Patent No.: US 8,929,680 B2
(45) Date of Patent: Jan. 6, 2015

(54) METHOD, APPARATUS AND SYSTEM FOR IDENTIFYING DISTRACTING ELEMENTS IN AN IMAGE

(71) Applicant: Canon Kabushiki Kaisha, Tokyo (JP)

(72) Inventor: Clement Fredembach, Ultimo (AU)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 13/706,097

(22) Filed: Dec. 5, 2012

(65) Prior Publication Data

US 2013/0148910 A1 Jun. 13, 2013

(30) Foreign Application Priority Data

Dec. 12, 2011 (AU) .................. 2011253980

(51) Int. Cl.
*G06K 9/40* (2006.01)
*G06K 9/46* (2006.01)
*G06T 7/00* (2006.01)

(52) U.S. Cl.
CPC ............... *G06K 9/40* (2013.01); *G06K 9/4623* (2013.01); *G06K 9/4638* (2013.01); *G06K 9/4671* (2013.01); *G06T 7/0081* (2013.01); *G06T 2207/20141* (2013.01)
USPC ........... 382/275; 382/103; 382/173; 382/224; 382/274; 382/260

(58) Field of Classification Search
CPC .......... G06T 2207/20164; G06T 2207/20201; G06T 2207/20182; G06T 2207/20192; G06T 2207/20172; G06T 2207/20141; G06T 7/0081; A61N 1/36046; G09B 21/008; G06K 9/40; G06K 9/4623; G06K 9/4671; G06K 9/463

USPC ......... 382/103, 173, 224, 254, 275, 274, 256, 382/260; 348/606, 617, 615, 622, 624

See application file for complete search history.

(56) References Cited

U.S. PATENT DOCUMENTS

2009/0112287 A1* 4/2009 Greenberg et al. ............. 607/54
2010/0226564 A1* 9/2010 Marchesotti et al. ......... 382/159

(Continued)

FOREIGN PATENT DOCUMENTS

JP 2006108723 A 4/2006

OTHER PUBLICATIONS

Itti, Laurent & C. Koh. "A saliency-based search mechanism for overt and covert shifts of visual attention". Vision Research. 40 (2000): 1489-1506.

(Continued)

*Primary Examiner* — Ali Bayat
(74) *Attorney, Agent, or Firm* — Canon U.S.A., Inc. IP Division

(57) ABSTRACT

A method of identifying a distracting element in an image (e.g., 1100), is disclosed. A visual attention map (e.g., 1120) is determined for the image (1100), the visual attention map (1120) representing one or more regions of the image, at least one of the regions corresponding to at least a portion of a subject of the image. A salient region map (e.g., 1110) is determined for the image (1100), the salient region map comprising a distribution of visual attraction values defining one or more further regions of the image (1100), the one or more further regions being categorized as salient. An intersection between the visual attention map (1120) and the salient region map (1110) is determined to identify a distracting element in the image (1100). The distracting element corresponds to at least one of the salient regions.

13 Claims, 13 Drawing Sheets

(56) References Cited

U.S. PATENT DOCUMENTS

2010/0329550 A1* 12/2010 Cheatle .................. 382/165
2010/0329588 A1   12/2010 Cheatle

OTHER PUBLICATIONS

Su, Sara L., F. Durand & M. Agrawala. "De-emphasis of distracting image regions using texture power maps". In M. Chantler & O. Drbohlav (Ed.), Texture 2005: Proceedings of the 4th International Workshop on Texture Analysis and Synthesis, held Oct. 21, 2005 in Beijing, China. Edinburgh, Scotland, UK: Heriot-Watt University (2005) pp. 119-124.

Lee, Seungjin, et al. "Familiarity based unified visual attention model for fast and robust object recognition." Pattern Recognition. 43.3 (2010) 1116-1128. European Examiner asserted "the whole document" as relevant.

Jungkunz, Patrick W. "Modeling human visual perception for target detection in military simulations". Diss. Naval Postgraduate School, MOVES Institute. 2009. Retrieved Mar. 7, 2013 from http://oai.dtic.mil/oai/oai?verb=getRecord&metadataPrefix=html&identifier=ADA501666. Re-retrieved Apr. 1, 2013. European Examiner asserted "pp. 103-133" as relevant.

Navalpakkam, V., Itti, Laurent. "An Integrated Model of Top-down and Bottom-up Attention for Optimizing Detection Speed." 2006 IEEE Computer Society Conference on Computer Vision and Pattern Recognition (CVPR'06). Jun. 17-22, 2006, New York, New York, USA. Los Alamitos, CA: IEEE Computer Society, II (2006) 2049-2056. European Examiner asserted "abstract: figure 1" as relevant.

Extended European search report in corresponding European Patent Application No. 12196766.7-1906, dated Mar. 19, 2013, six pages.

Lee, Seungjin, Kwanho Kim, Joo-Young Kim, Minsu Kim, and Hoi-Jun Yoo. "Familiarity Based Unified Visual Attention Model for Fast and Robust Object Recognition." Pattern Recognition 43.3 (2010): 1116-128. Print.

* cited by examiner

METHOD, APPARATUS AND SYSTEM FOR IDENTIFYING DISTRACTING ELEMENTS IN AN IMAGE

THE CROSS-REFERENCE TO RELATED PATENT APPLICATIONS

This application claims the right of priority under 35 U.S.C. §119 based on Australian Patent Application No. 2011253980, filed 12 Dec. 2011, which is incorporated by reference herein in its entirety as if fully set forth herein.

FIELD OF INVENTION

The present invention relates to the field of image processing and, in particular, to enhancement of images. The present invention also relates to a method and apparatus for identifying a distracting element in an image, and to a computer program product including a computer readable medium having recorded thereon a computer program for identifying a distracting element in an image.

DESCRIPTION OF BACKGROUND ART

A person viewing an image will not attend to the entire content of the image, but will selectively look at regions within the image. A professional-grade image, photograph or painting, will guide the gaze of the onlooker towards a region of interest with compositional techniques such as selective focus, colour and luminance contrast, and positioning of elements in a scene captured by the image.

Not all image practitioners are of equal proficiency. Further, the scene captured within an image cannot necessarily be controlled. As a result, a large number of images incorporate distracting elements that hinder an intended photographic output. Such image "distractors" may be thought of as unwanted, unnecessary, elements in an image which attract the attention of an observer away from an originally intended (or main) subject or region of interest. Distracting elements in an image may include artefacts.

Removing distracting elements is typically a two-step process involving detection of an image region as a distracting element (or distractor), and removal, or attenuation of that distracting element (or distractor). However, distracting elements can vary greatly in their statistics and appearance. Removing distracting elements requires knowledge of how an image would look without the distracting elements.

Most conventional methods of reducing visibility of distracting elements focus on removing highly specific cases such as noise, dust, or scratches. In these instances, a model of the distracting elements (or distractors) is typically built and employed to identify the artefacts in the image. Once identified, the same model is used to infer a distractor-free image.

When large regions of an image are identified as distracting elements, inpainting methods may be employed to reconstruct an artefact-free version of the image. However, inpainting methods are notoriously unreliable and computationally costly.

An important shortcoming of objective-based distracting element attenuation methods is that such methods decrease magnitude of distracting elements in an objective colour space (e.g., peak signal to noise ratio (psnr) or International Commission of Illumination (CIE) Delta E) which often have very little perceptual significance. However, in photography or any time a human user/observer is the intended viewer, distractors are of perceptual nature. The impact and influence of distracting elements on perceived image quality varies in a subjective fashion.

Most conventional methods that attempt to address the distracting element problem in images do so by sidestepping the problem. For example, the subject, or region of interest of the image is identified and what is not part of the subject is treated as "noise" (or background). Non-subject parts of the image then have their visibility reduced uniformly by being cropped out or blurred. While such methods may reduce the visibility of distracting elements (or distractors), such methods do not necessarily improve perceived quality of the image. Generally, alterations are so large and widespread that the effectiveness of such methods, from a perceptual standpoint is highly image, content, and observer dependent.

Thus, a need clearly exists for an improved method of identifying a distracting element in an image.

SUMMARY OF THE INVENTION

It is an object of the present invention to substantially overcome, or at least ameliorate, one or more disadvantages of existing arrangements.

According to one aspect of the present disclosure there is provided a method of identifying a distracting element in an image, said method comprising:

determining a visual attention map for the image, said visual attention map representing one or more regions of the image, at least one of said regions corresponding to at least a portion of a subject of the image;

determining a salient region map for the image, said salient region map comprising a distribution of visual attraction values defining one or more further regions of the image, said one or more further regions being categorised as salient; and identifying a distracting element in said image based on the visual attention map and the salient region map, wherein said distracting element corresponds to at least one of the salient regions.

According to another aspect of the present disclosure there is provided an apparatus for identifying a distracting element in an image, said apparatus comprising:

means for determining a visual attention map for the image, said visual attention map representing one or more regions of the image, at least one of said regions corresponding to at least a portion of a subject of the image;

means for determining a salient region map for the image, said salient region map comprising a distribution of visual attraction values defining one or more further regions of the image, said one or more further regions being categorised as salient; and means for identifying a distracting element in said image based on the visual attention map and the salient region map, wherein said distracting element corresponds to at least one of the salient regions.

According to still another aspect of the present disclosure there is provided a system for identifying a distracting element in an image, said system comprising:

a memory for storing data and a computer program;

a processor coupled to said memory for executing said computer program, said computer program comprising instructions for:

determining a visual attention map for the image, said visual attention map representing one or more regions of the image, at least one of said regions corresponding to at least a portion of a subject of the image;

determining a salient region map for the image, said salient region map comprising a distribution of visual attraction values defining one or more further regions of the image, said one or more further regions being categorised as salient; and identifying a distracting element in said image based on the visual attention map and the salient region map, wherein said distracting element corresponds to at least one of the salient regions.

According to still another aspect of the present disclosure there is provided a computer readable medium having recorded thereon a computer program for identifying a distracting element in an image, said program comprising:

code for determining a visual attention map for the image, said visual attention map representing one or more regions of the image, at least one of said regions corresponding to at least a portion of a subject of the image;

code for determining a salient region map for the image, said salient region map comprising a distribution of visual attraction values defining one or more further regions of the image, said one or more further regions being categorised as salient; and code for identifying a distracting element in said image based on the visual attention map and the salient region map, wherein said distracting element corresponds to at least one of the salient regions.

Other aspects of the invention are also disclosed.

BRIEF DESCRIPTION OF THE DRAWINGS

One or more embodiments of the invention will now be described with reference to the following drawings, in which.

DETAILED DESCRIPTION

Figure 1:
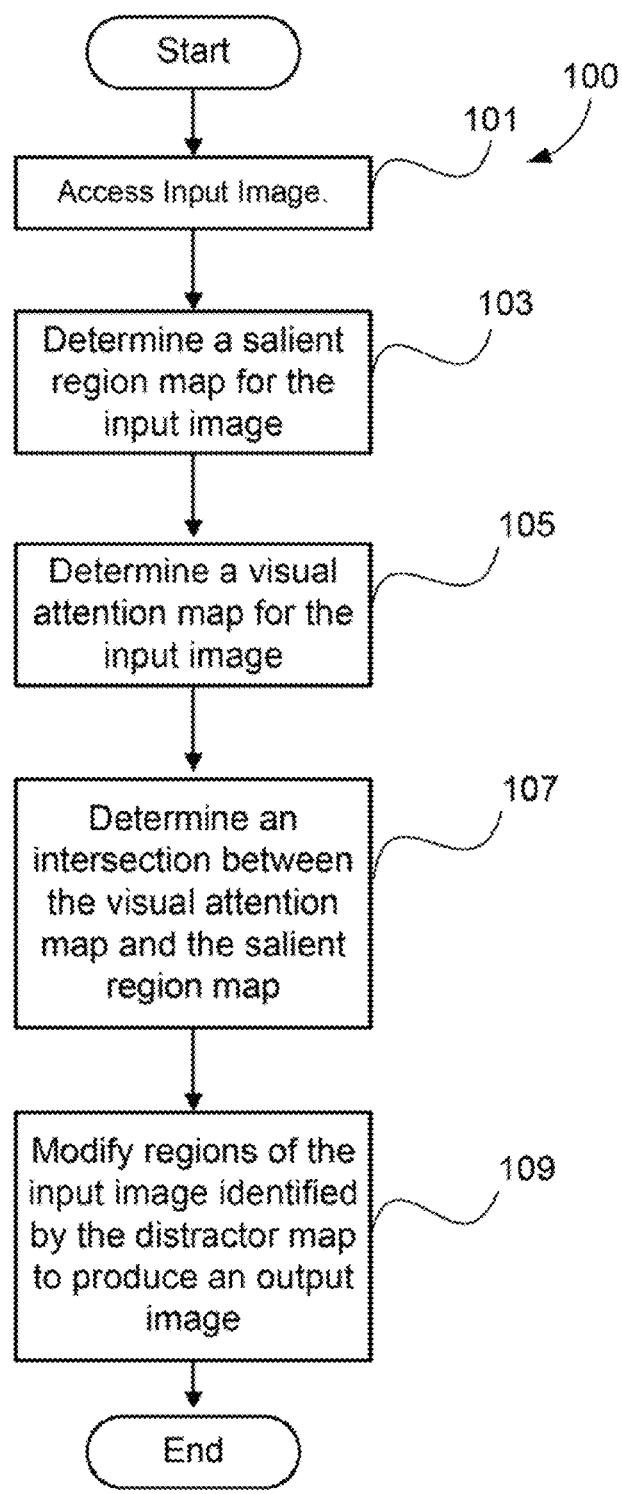
FIG. 1 is a flow diagram showing a method of modifying an image.

Where reference is made in any one or more of the accompanying drawings to steps and/or features, which have the same reference numerals, those steps and/or features have for the purposes of this description the same function(s) or operation(s), unless the contrary intention appears.

Disclosed are methods which seek to modify an image so that predicted "visual attention maps" obtained with diverse modalities are similar. The methods described below minimise visibility of visually unappealing or distracting elements in the image and ensure that the image viewed by different observers is perceived in a uniform manner. In particular, a method 100 of modifying an image, by attenuating distracting elements in the image, is described below with reference to FIG. 1. The described method 100 modifies the image so that visibility of distracting elements in the image is minimised. A distracting element is a region of an image that attracts attention of an observer away from intended main subject or main region of interest of the image. A distracting element is salient and has a high attention attraction potential. For example, a distracting element may be a brightly coloured object (or region) in the background of a portrait photograph.

Images that contain distracting elements are consistently ranked lower by observers, in terms of preference, than images that are free of distracting elements. Images may be enhanced by reducing visibility of such distracting elements.

The method 100 reduces the visibility of distracting elements within an image by decomposing the image, as described below. Regions of the image that are likely to be salient are identified using low-level visual features that correlate with sensitivity of the human visual system, to produce a salient region map. The salient region map is a map of elements regions of the image that are likely to attract attention of an observer. As described below, the salient region map defines a distribution of visual attraction values. Elements or regions of the image that are salient but should not be attended to are considered to be distracting elements.

The method 100 also decomposes the image into low- and high-level features that correlate with the cognitive manner in which an observer analyses the image for content, to produce a visual attention map (or subject map) defining regions of the image consciously attended to by the observer.

As described below, the method 100 determines a distractor map defining the distracting element(s) in the image. The method 100 is determined by combining the salient region map and the visual attention map. The distractor map comprises the elements of the image that are present in the salient region map but not in the visual attention map. The distractor map is then analysed together with the image to modify the image to attenuate the distracting elements identified in the image, producing an output image.

Figure 10A:
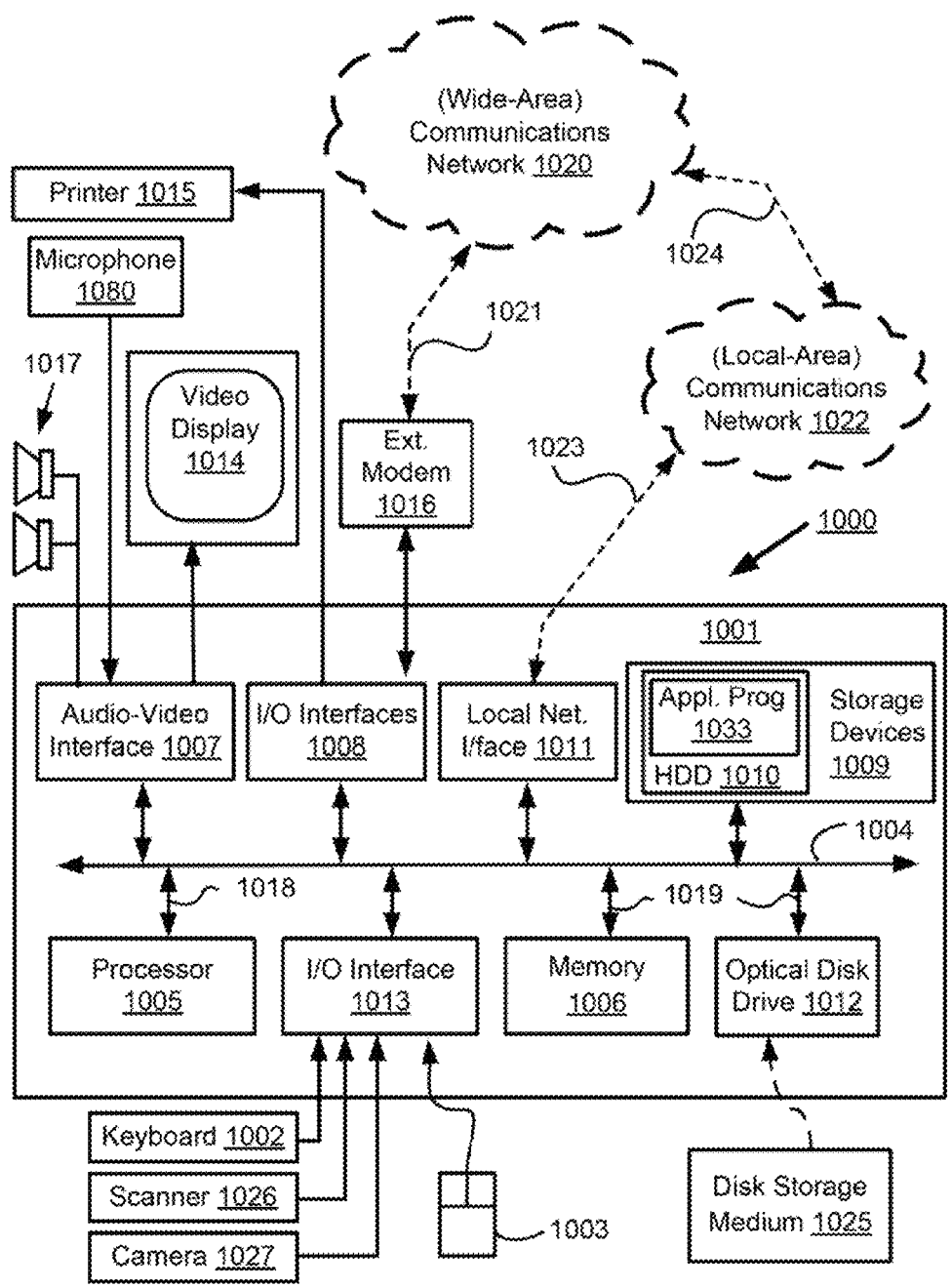
FIGS. 10A and 10B form a schematic block diagram of a general purpose computer system upon which arrangements described may be practiced.
Figure 10B:
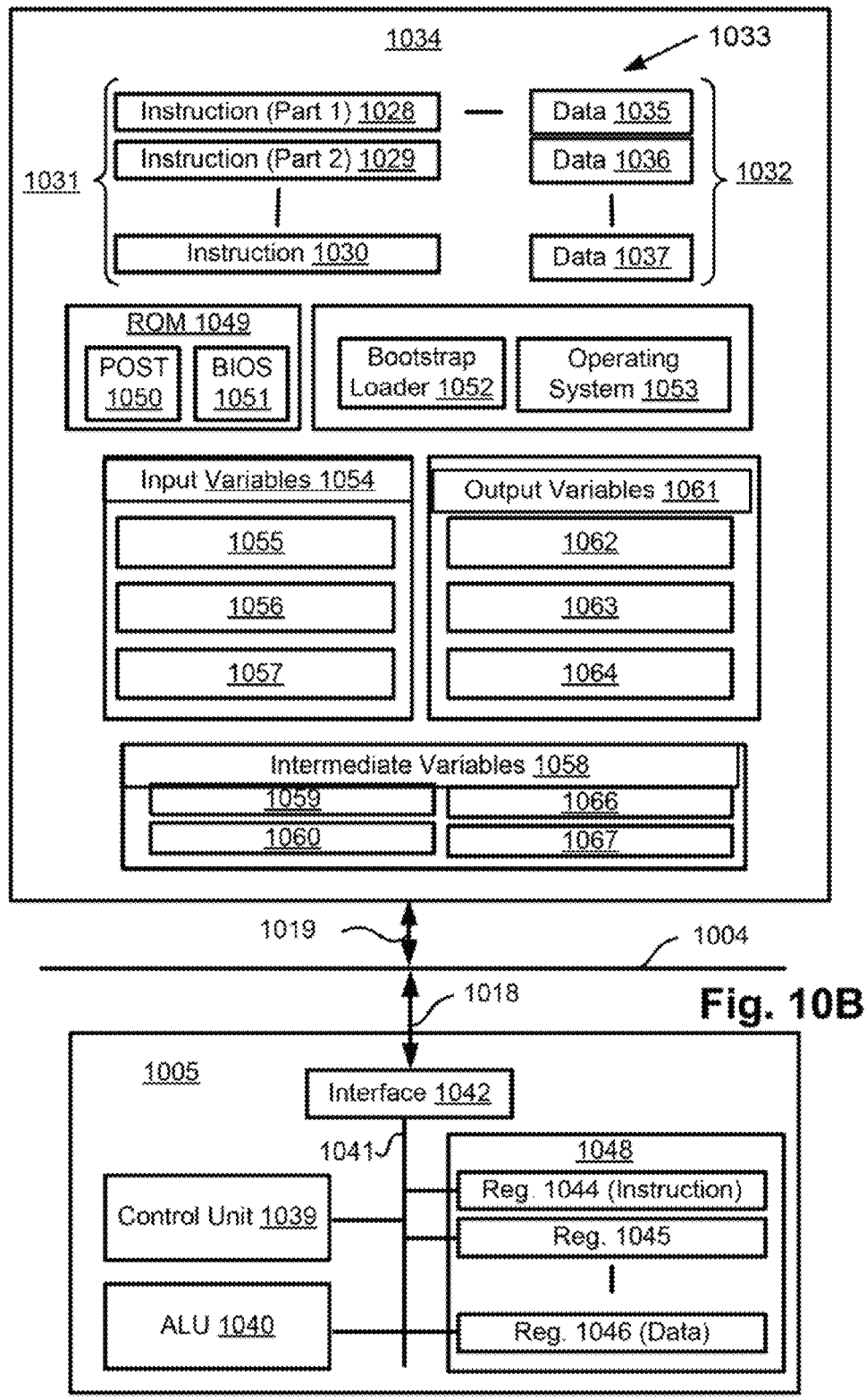

FIGS. 10A and 10B depict a general-purpose computer system 1000, upon which the methods to be described can be practiced. The methods to be described may also be practiced on other devices such as, for example, a digital camera, a mobile phone or a portable media player, in which processing resources are limited.

As seen in FIG. 10A, the computer system 1000 includes: a computer module 1001; input devices such as a keyboard 1002, a mouse pointer device 1003, a scanner 1026, a camera 1027, and a microphone 1080; and output devices including a printer 1015, a display device 1014 and loudspeakers 1017. An external Modulator-Demodulator (Modem) transceiver device 1016 may be used by the computer module 1001 for communicating to and from a communications network 1020 via a connection 1021. The communications network 1020 may be a wide-area network (WAN), such as the Internet, a cellular telecommunications network, or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the communications network 1020.

The computer module 1001 typically includes at least one processor unit 1005, and a memory unit 1006. For example, the memory unit 1006 may have semiconductor random access memory (RAM) and semiconductor read only memory (ROM). The computer module 1001 also includes an number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 1027 and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the computer system 1000 via a connection 1023 to a local-area communications network 1022, known as a Local Area Network (LAN). As illustrated in FIG. 10A, the local communications network 1022 may also couple to the wide network 1020 via a connection 1024, which would typically include a so-called "firewall" device or device of similar functionality. The local network interface 1011 may comprise an Ethernet circuit card, a Bluetooth™ wireless arrangement or an IEEE 802.11 wireless arrangement; however, numerous other types of interfaces may be practiced for the interface 1011.

The I/O interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1000.

The components 1005 to 1013 of the computer module 1001 typically communicate via an interconnected bus 1004 and in a manner that results in a conventional mode of operation of the computer system 1000 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac™ or alike computer systems.

The method 100 may be implemented using the computer system 1000 wherein the processes of FIGS. 1 to 9, to be described, may be implemented as one or more software application programs 1033 executable within the computer system 1000. In particular, the steps of the described methods are effected by instructions 1031 (see FIG. 10B) in the software 1033 that are carried out within the computer system 1000. The software instructions 1031 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 1033 is typically stored in the HDD 1010 or the memory 1006.

The software is loaded into the computer system 1000 from the computer readable medium, and then executed by the computer system 1000. Thus, for example, the software 1033 may be stored on an optically readable disk storage medium (e.g., CD-ROM) 1025 that is read by the optical disk drive 1012. A computer readable medium having such software or computer program recorded on the computer readable medium is a computer program product. The use of the computer program product in the computer system 1000 preferably effects an advantageous apparatus for implementing the described methods.

In some instances, the application programs 1033 may be supplied to the user encoded on one or more CD-ROMs 1025 and read via the corresponding drive 1012, or alternatively may be read by the user from the networks 1020 or 1022. Still further, the software can also be loaded into the computer system 1000 from other computer readable media. Computer readable storage media refers to any non-transitory tangible storage medium that provides recorded instructions and/or data to the computer system 1000 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and the corresponding code modules mentioned above may be executed to implement one or more graphical user interfaces (GUIs) to be rendered or otherwise represented upon the display 1014. Through manipulation of typically the keyboard 1002 and the mouse 1003, a user of the computer system 1000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1009, 1006), and a basic input-output systems software (BIOS)module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory 1034 (1009, 1006) to ensure that each process or application running on the computer module 1001 has sufficient memory in which to execute without colliding with memory allocated to another process. Furthermore, the different types of memory available in the system 1000 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the computer system 1000 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically includes a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1030, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1105 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1002, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The described methods use input variables 1054, which are stored in the memory 1034 in corresponding memory locations 1055, 1056, 1057. The described methods produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:

(a) a fetch operation, which fetches or reads an instruction 1031 from a memory location 1028, 1029, 1030;

(b) a decode operation in which the control unit 1039 determines which instruction has been fetched; and (c) an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

Each step or sub-process in the processes of FIGS. 1 to 9 is associated with one or more segments of the program 1033 and is performed by the register section 1044, 1045, 1047, the ALU 1040, and the control unit 1039 in the processor 1005 working together to perform the fetch, decode, and execute cycles for every instruction in the instruction set for the noted segments of the program 1033.

The described methods may alternatively be implemented in dedicated hardware such as one or more integrated circuits performing the functions or sub functions of described methods. Such dedicated hardware may include graphic processors, digital signal processors, or one or more microprocessors and associated memories.

Figure 11A:
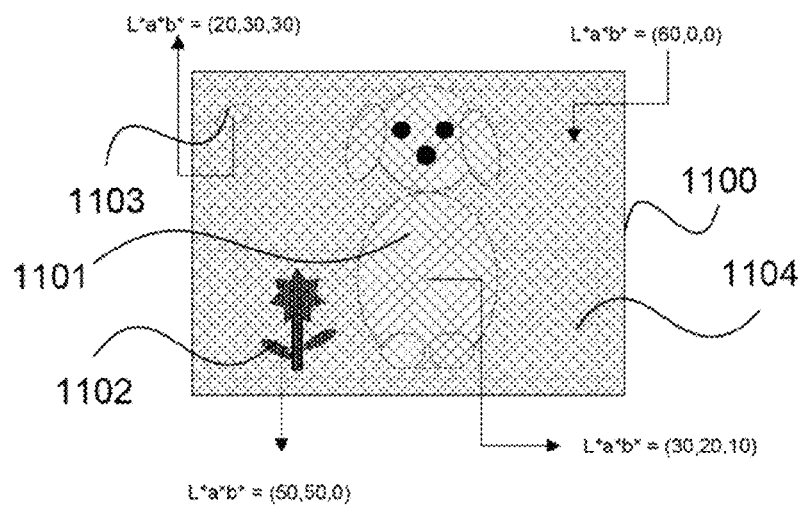
FIG. 11A shows an example image.

The method 100 begins at step 101, where the processor 1005 accesses an input image I. As example of such an input image is image 1100 of FIG. 11A. The input image may be accessed by the processor 1005 from, for example, the hard disk drive 1010 and/or the memory 1006. The accessed input image I is typically encoded in accordance with a particular colour space, such as sRGB, HSV or CIELab.

Figure 11B:
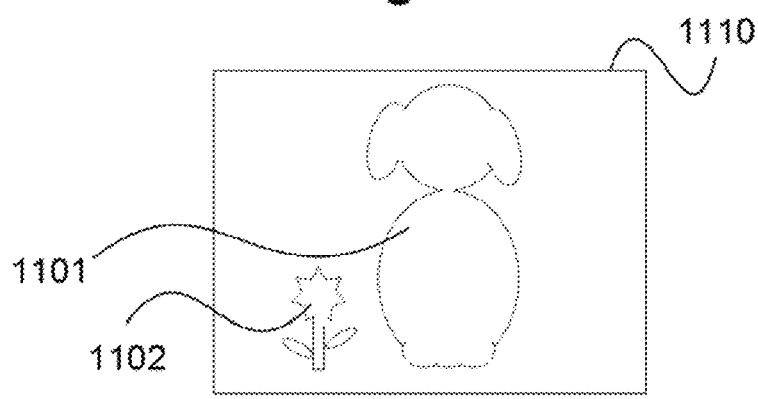
FIG. 11B shows a salient region map determined for the image of FIG. 11A in accordance with the method.

Then at salient region detection step 103, the processor 1005 performs the step of determining a salient region map S. The salient region map S may be stored in the memory 1006. As described below, the salient region map S comprises a distribution of visual attraction values defining one or more regions of the input image I. FIG. 11B shows an example of a salient region map S 1110 determined for the image 1100. The salient region map S 1110 is determined in accordance with step 103, as will be described in detail below.

The regions of the salient region map S are categorised as salient and may be used to detect salient regions of the input image I. The salient regions of the input image are detected by determining features of the input image that are relevant to low-level vision of an observer, such as colour, luminance sharpness, size, texture and orientation. For example, the luminance of the input image may be determined based on the luminance channel L* of the CIELab colour space or the lightness channel Y of the XYZ colour space. Further, hue may be determined by determining arctan(b/a) of the CIELab colour space or based on the hue channel H of the HSV colour space. To determine Chroma, (eg, the Euclidian distance between colours in the a-b plane of the CIELab colour space, the a* channel, b* channel of the ab plane, or any other channel where chrominance is decorrelated from luminance, such as the channels obtained with principal component analysis), may be determined at step 103. The sharpness of the input image may be determined by determining spectral power from a wavelet or Fourier decomposition, magnitude of gradients or histogram of gradients for the input image. The texture and orientation of the input image may be determined by, for example, determining output of a Gabor filter bank.

In one implementation, at step 103, the processor 1005 determines a set of n features $\xi_i$, i=1, ..., n combined at scales $\Gamma_c$ and $\Gamma_s$, where $\Gamma_c$ and $\Gamma_s$ represent regions of the input image I that may be centered on a considered pixel. The region $\Gamma_c$ is smaller than the region $\Gamma_s$ and corresponds to a scale of perceptually significant features of the image. The value and shape of the region $\Gamma_c$ may vary depending on the observer of the input image or content of the input image. However, the value of the region $\Gamma_c$ is estimated to be between two (2) and eight (8) degrees of subtended visual angle, with a greater emphasis on the region $\Gamma_c$ being smaller than twelve (12) degrees of visual angle. The value of the region $\Gamma_s$ may vary more significantly, and may range from being just a few degrees larger than the region $\Gamma_c$ to spanning the entire input image.

The regions $\Gamma_s$ and $\Gamma_c$ may be pre-determined. Alternatively, the regions $L_s$ and $\Gamma_c$ may be determined as part of the salient region detection step 103 when a multi-scale method, such as a Laplacian pyramid decomposition, is used at step 103.

In one arrangement, for each pixel (x,y) of the input image I, the processor 1005 determines each value in the salient region map S at step 103 using a function S(x,y), in accordance with Equation (1), as follows:

$$S(x,y) = f(\xi_1, \xi_2, \ldots, \xi_n, x, y, I, \Gamma_c, \Gamma_s) \quad (1)$$

where $f$ is a function defined over the colour space of the input image I. For example, if three features CIELab, L*, a*, and b* as $\xi_1$, $\xi_2$, $\xi_3$, respectively, are used to determine the salient region map S and the function $f$ is defined as a Euclidian distance over the three features, $\xi_1$, $\xi_2$, $\xi_3$, the function S(x,y) may be expressed in accordance with Equation (2), as follows:

$$S(x, y) = \left( \sum_{i=1}^{3} \left( \xi_i(x, y, \Gamma_c) - \frac{\sum_x \sum_y \xi_i(x, y, \Gamma_s)}{N} \right)^2 \right)^{\frac{1}{2}} \quad (2)$$

where N represents the number of pixels present in the double summation over x and y. In the above example, the region $\Gamma_s$ is defined over the entire input image I and so N represents the number of pixels in the input image I. The function $f$ may also be defined as a general linear combination of features of the input image I, or a non-linear combination of features of the input image I, such as a quantised contribution, a logarithmic response, or a winner-takes-all method. For example, values determined by the function S(x,y) may depend on maximal response of a feature $\xi_i$ rather than a combination of such features.

Alternatively, an existing salient detection method may be used at step 103. For example, the article by L. Itti and C. Koch entitled "A saliency-based search mechanism for overt and covert shifts of visual attention", Vision Research, (40), Issues 10-12, June 2000. Pages 1489-1506, discloses a salient detection method suitable for use at step 103.

The salient region map S contains the amount of saliency that a pixel or region of the input image I possesses with respect to the specific function $f$ of Equation (1) used in the salient region detection step 103. In one arrangement, the salient region map S may be represented as a probability density function, $S_T$, in accordance with Equation (3), as follows:

$$S_T(x, y) = \frac{S(x, y)}{\sum_x \sum_y S(x, y)} \quad (3)$$

The probability density function, $S_T$, may be referred to as the normalised salient region map.

At attention detection step 105, the processor 1005 performs the step of determining a visual attention map A for the input image. The determined visual attention map A may be stored within the memory 1006. The visual attention map is a second salient map different to the salient region map determined in step 103. The visual attention map A is configured for representing one or more regions of the input image I. The regions of the visual attention map A may be used to identify elements of the input image that receive top-down, cognitive, visual attention by the observer (i.e., elements that the observer perceives as being the subject of the image). At least one of the regions represented by the visual attention map A is a region corresponding to at least a portion of the subject of the image. In contrast, the salient region detection step 103 models the bottom-up, low-level, physiological visual response of the observer to the input image (i.e., elements that the observer is attracted to in the image).

Figure 11C:
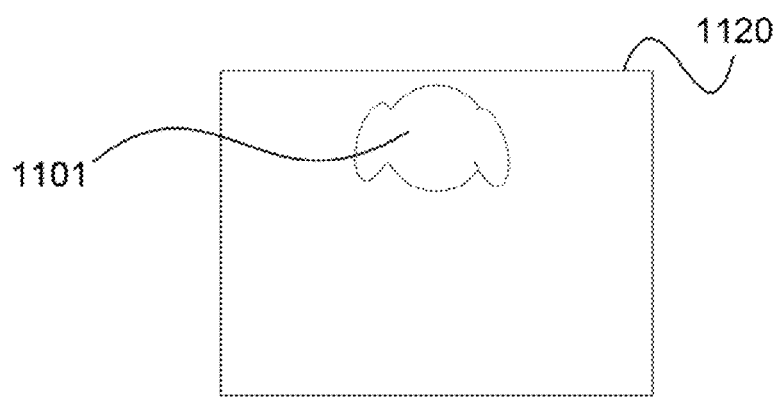
FIG. 11C shows a visual attention map determined for the image of FIG. 11A in accordance with the method.

FIG. 11C shows an example of a visual attention map A 1120 determined for the image 1100. The visual attention map A 1120 is determined in accordance with step 103, as will be described in detail below. As described below, the regions represented by visual attention map A 1120 depend on content of the input image I 1100.

The visual attention map A may be represented as a probability density function $A_T$, in accordance with Equation (4), $$A_T(x, y) = \frac{A(x, y)}{\sum_x \sum_y A(x, y)}. \quad (4)$$

The probability density function $A_T$ may be represented as a normalised visual attention map.

Figure 2:
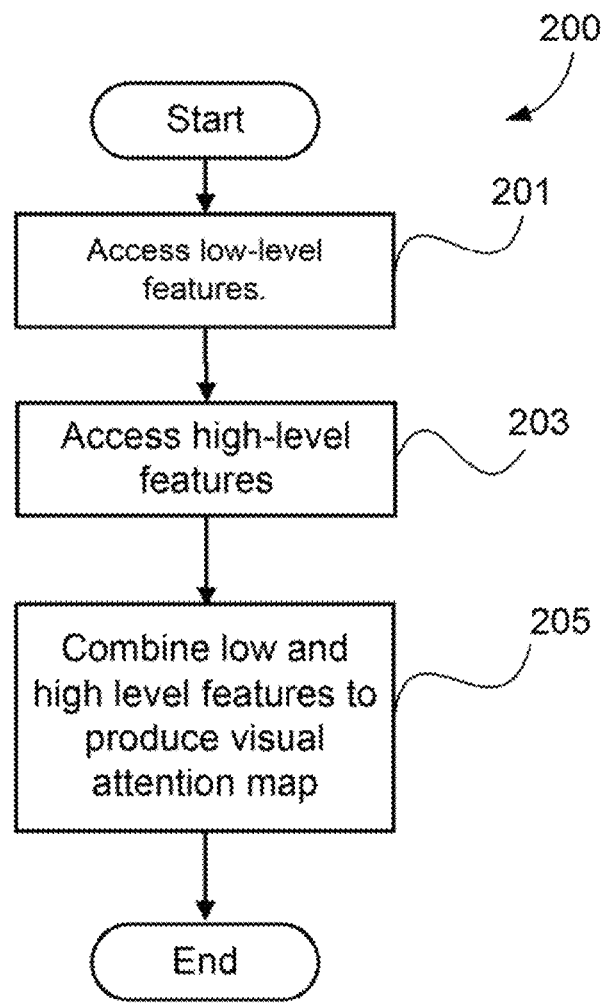
FIG. 2 is a flow diagram showing a method of determining a visual attention map, as executed in the method of FIG. 1.

A method 200 of determining a visual attention map, as executed at step 105, will be described in detail below with reference to FIG. 2. An alternative method 300 of determining a visual attention map, as executed at step 105, will also be described in detail below with reference to FIG. 3. A further alternative method 400 of determining a visual attention map, as executed at step 105, will also be described in detail below with reference to FIG. 4.

Then at distracting element identification step 107, the processor 1005 performs the step of determining an intersection between the visual attention map A and the salient region map S to identify distracting elements in the input image I. In particular, a distractor map D is determined based on the intersection of the salient region map S and the visual attention map A. The distractor map D represents elements of salient region map S that are not present in visual attention map A. The distractor map D determined at step 107 may be stored within the memory 1006.

Figure 11D:
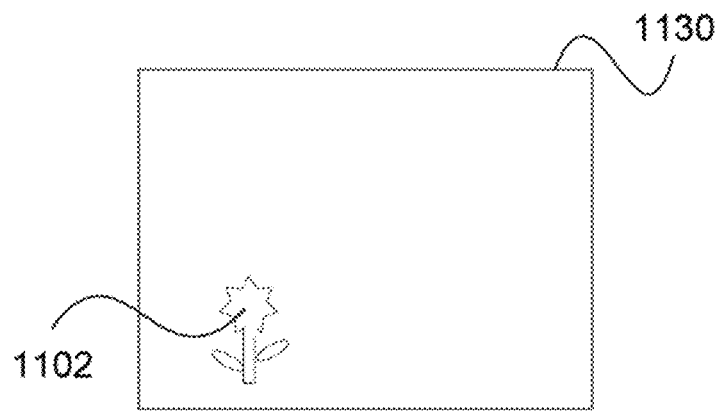
FIG. 11D shows a distractor map determined for the image of FIG. 11A.

FIG. 11D shows a distractor map 1130 determined for the image 1100 using the salient region map S 1110 and the visual attention map A 1120. The distractor map 1130 is determined in accordance with step 107, as described in detail below.

The elements of the salient region map S that are not present in visual attention map A represent regions of the input image I that are salient from a low-level vision perspective, but are not relevant for cognitive attention. The elements of salient region map S that are not present in visual attention map A are elements that distract from the main (or intended) subject of the input image.

The distractor map D identifies regions of the input image I that are salient, yet that are not, or should not be, attended to by the observer, or that are not part of the intended subject or region of interest. A distracting element identified at step 107 corresponds to at least one of the salient regions of the salient region map S. The distracting elements effectively distract attention of the observer from the main subject of the image, thus lowering perceived quality of the input image.

Images are generally perceived to be of higher quality when no distracting elements are present within the image and a corresponding distractor map D is empty. The perceived quality of the input image may thus be increased by removing distracting elements identified in the distractor map.

A method 500 of identifying one or more distracting elements in an image, as executed at step 107, will be described in detail below with reference to FIG. 5. An alternative method 600 of identifying one or more distracting elements in an image, as executed at step 107, will be described in detail below with reference to FIG. 6.

Then at distractor attenuation step 109, the processor 1005 selectively modifies regions of the input image, as identified by the distractor map D to produce an output image, where saliency of the regions of the input image I identified by the distractor map D are attenuated in the output image. The output image determined at step 109 may be stored within the memory 1006. A method 700 of attenuating saliency of regions of the input image identified by the distractor map D, as executed at step 109, will be described in detail below with reference to FIG. 7.

Since the distractor map D identifies elements of the input image that are present in the salient region map but not in the visual attention map, the regions of the input image that are relevant to visual attention or subject matter are not modified and are preserved in an output image. The output image is a modified version of the input image where the magnitude of distracting elements identified by the distractor map D have been reduced.

Figure 11E:
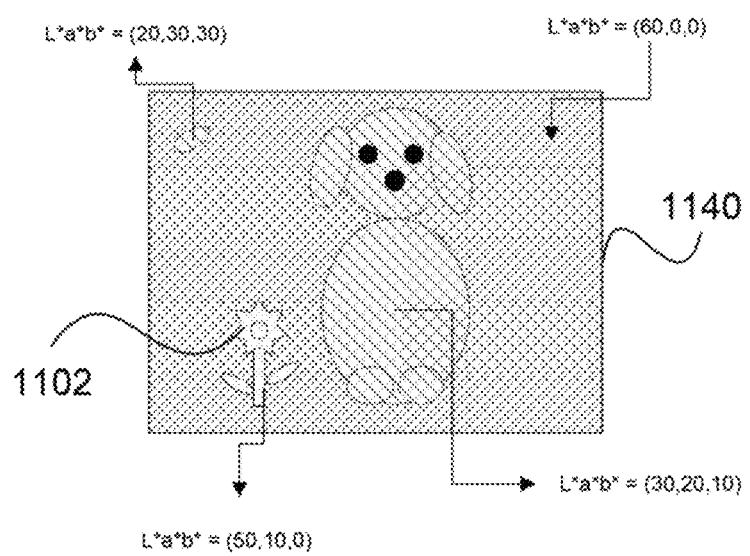
FIG. 11E shows an output image determined for the input image of FIG. 11A in accordance with the method of FIG. 1.

FIG. 11E shows an output image 1140 determined for the input image 1100. The output image 1140 is determined in accordance with step 109 of the method 100, as will be described in detail below.

To attenuate the distracting elements present in the distractor map, knowledge of why the distracting elements are salient is required. Such knowledge is provided by knowledge of the function $f$ and input parameters from the salient region detection step 103.

Given the input image I, a distractor map D and the salient region detection step 103 parameters $f(\xi_1, \xi_2, \ldots, \xi_n, x, y, I, \Gamma_c, \Gamma_s)$, the distractor attenuation step 107 creates output image $\hat{I}$, in accordance with Equation (5) below:

$$f(\check{\xi}_1, \check{\xi}_2, \ldots, \check{\xi}_n, x, y, \hat{I}, \Gamma_c, \Gamma_s) \leq f(\xi_1, \xi_2, \ldots, \xi_n, x, y, I, \Gamma_c, \Gamma_s) \quad (5)$$

The features $\check{\xi}_i$ are the same features as the features $\hat{\xi}_i$, except taken over the output image $\hat{I}$ rather than the input image $\hat{I}$. The smaller than or equal sign ($\leq$) of Equation (5) takes into account the fact that some salient regions are also attention regions present in the visual attention map configured within memory 1006.

The regions of the input image that are candidate for attenuation are identified by determining the pixel position x and y for which $D(x,y) > \alpha$, where $\alpha$ is a suitable threshold. For example, the threshold $\alpha$ may be 80% of the maximum value of the distractor map D. Pixels within the candidate regions are then augmented by neighbour pixels for which $S(x,y) > 0$ in a monotonically decreasing fashion, to prevent adding non-candidate pixels from a neighbouring salient cluster. Alternatively, a threshold may be used to determine which pixels within the candidate regions are to be augmented. Once all the candidate pixels have been identified, the visibility of distracting elements may be decreased. If the reason for a particular region being deemed salient is known, the pixel values of the region may be modified to make the region less salient.

Potentially a large number of dimensions need to be dealt with when decomposing a function such as $f$. However, an advantage of the described methods is that distracting elements are identified as salient, low-level vision, regions. Such low-level vision features are few and mathematically manageable, as only the low-level features and the scale parameters have to be taken into account. The scale parameters ($\Gamma_\perp c, \Gamma_\perp s$) are provided at step 103.

By measuring the values of the low-level features $\xi_i$ of the candidate pixels and the immediate, non-salient, surroundings (i.e., as defined by the scale parameters) of the candidate pixels, the differences between the candidate pixels and the background of the candidate pixels may be determined according to Equation (2) described above. Since the function defined by Equation (2) is separable, the contribution of each feature may be individually identified. Distracting elements may be attenuated by selecting the feature that contributes the most to the salient region map S for the candidate pixels, and modifying the values of the candidate pixels so as to decrease saliency of the candidate pixels as measured by Equation (2).

The saliency of the candidate pixels may be decreased using various methods. In one implementation, values corresponding to the feature $\xi_i$ that contributes the most to the salient region map S for the candidate pixels may be modified to bring the feature to the same level as the feature $\xi_i$ with the second largest contribution. As a result, should the method 100 be employed again on the output image, the output image is stable to further iteration of the method 100.

The method 200 of determining a visual attention map, as executed at step 105, will now be described in detail with reference to FIG. 2. The method 200 may be implemented as one or more software code modules of the software application program 1033 resident on the hard disk drive 1010 and being controlled in its execution by the processor 1005.

The method 200 begins at access step 201, where the processor 1005 accesses, from the memory 1006, pre-determined low-level features $\xi_i$ of the candidate regions. Then at access step 203, the software application program 1033, accesses, from the memory 1006, high-level features s of the candidate regions. The low-level features and the high level features are used together with the input image, in visual attention determination step 205.

As described above with reference to the salient region detection step 103, the low-level features are those features of the image that are relevant to low-level vision of the observer. The low-level features include luminance, colour, sharpness, texture, texture orientation, and size. The low-level features accessed at step 201 cover early visual attention in the same manner as in the salient region detection step 103. The low-level features may be the same or a subset of the features used at step 103. The low-level features may be defined as $\psi_j$, where $\psi_j \in \{\xi_i\}$ and $j \leq i$. Alternatively, the low-level features are not used at visual attention determination step 205. Further, the number and type of low-level features that are accessed at step 201 and used at step 205 may vary.

The high-level features are specific to the attention detection step 105. The regions represented by the visual attention map A correspond to the high-level features of the input image I. The high-level features are features that are strongly correlated with measures of cognitive visual importance and/or found to be relevant in identifying subjects in images. The high-level features include a face, body, text, horizon, and object detection features. The high-level features are correlated with semantic or scene understanding concepts.

At visual attention step 205, the low-level and high-level features are combined together with the input image to produce the visual attention map A. In particular, the high-level features may be defined as $\omega_k$. In this instance, the visual attention map A may be defined in accordance with Equation (6), as follows:

$$A(x,y)=\Im(\psi_j,\omega_k,\lambda_j,v_k,x,y,I,\Gamma_c,\Gamma_s) \quad (6)$$

where the $\lambda_j$ and $v_k$ are weights associated with the low- and high-level features, respectively. The function g may be, similarly to the function f previously described, of any type. In one arrangement, the function g may be expressed as a weighted linear combination of power two (2). Equation (6) is similar in structure to Equation (2), except that the weights are different, where the weights have been empirically determined to be $v_k=1 \forall k$ and $\lambda_j=0.5 \forall j$.

As described above, the visual attention map A may be represented as a probability density function $A_T$.

Figure 3:
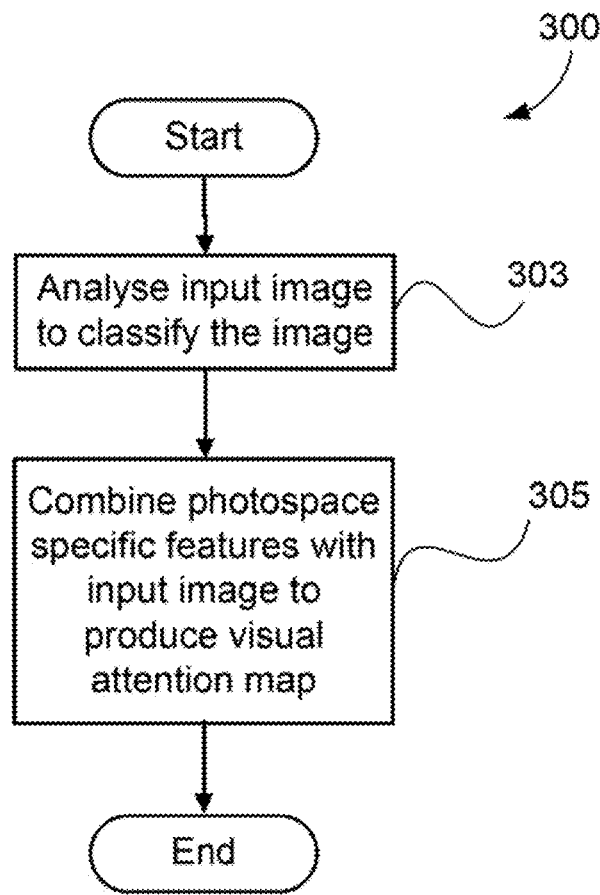
FIG. 3 is a flow diagram showing an alternative method of determining a visual attention map, as executed in the method of FIG. 1.

The alternative method 300 of determining a visual attention map, as executed at step 105, will now be described in detail below with reference to FIG. 3. The method 300 may be implemented as one or more software code modules of the software application program 1033 resident on the hard disk drive 1010 and being controlled in its execution by the processor 1005.

The method 300 begins at a photospace analysis step 303, where the processor 1005 analyses the input image in order to classify the image as belonging to one of several pre-determined photospace categories. The pre-determined photospace categories may include portrait, beach, landscape, outdoor, indoor, text and document. For each of the photospace categories, a number of predetermined features, which are particularly relevant to measure visual attention across the corresponding category, are stored with the memory 1006. The pre-determined features may be referred to as photospace specific features. The photospace specific features may be a mixture of low-level $\psi_j$ and high-level $\omega_k$ features and be given specific weights $\lambda_j$ and $v_k$. In the case of a portrait photospace, the weight given to a face detection feature reaches 90% of a sum of all weights.

Then at visual attention determination step 305, the photospace specific features are combined together with the input image to produce the visual attention map A. Accordingly, the photospace specific features are used in the visual attention determination step 305 in lieu of the low-level features and high-level features used in step 205 of the method 200 of FIG. 2.

Figure 4:
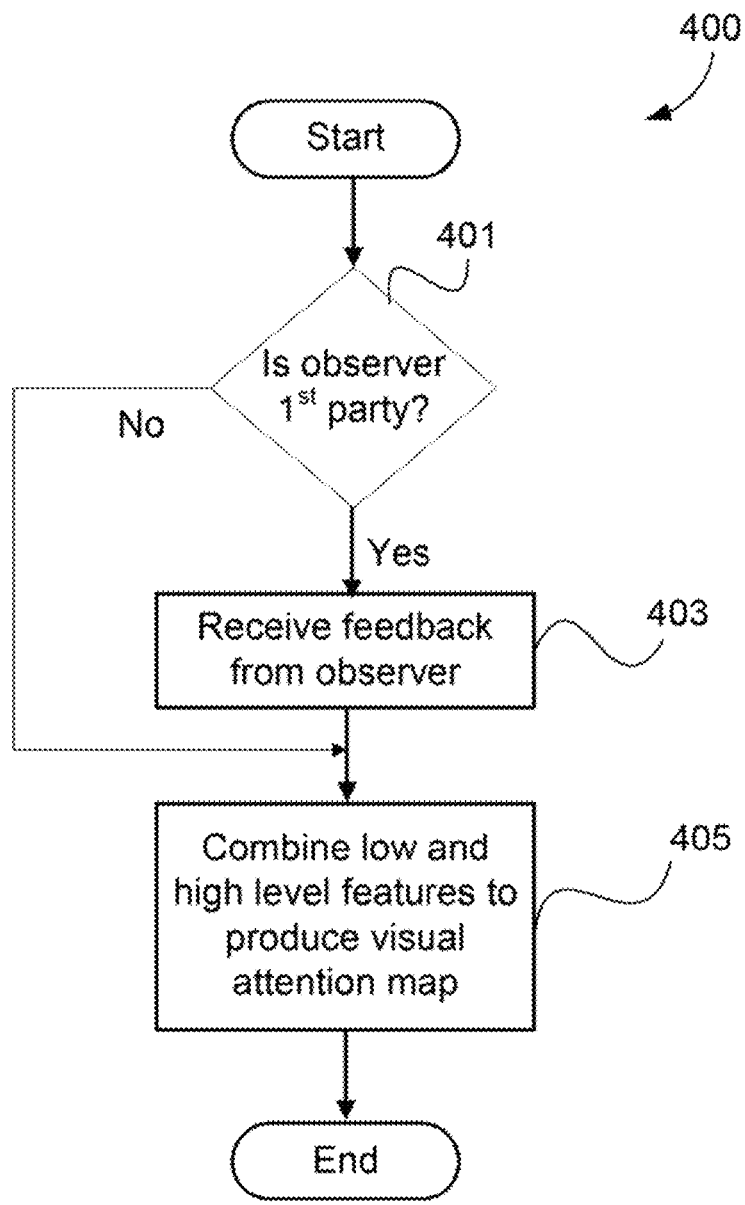
FIG. 4 is a flow diagram showing a further alternative method of determining a visual attention map, as executed in the method of FIG. 1.

The alternative method 400 of determining a visual attention map, as executed at step 105, will now be described in detail below with reference to FIG. 4. The method 400 may be implemented as one or more software code modules of the software application program 1033 resident on the hard disk drive 1010 and being controlled in its execution by the processor 1005. The regions represented by the visual attention map A depend on an intended observer of the input image I.

The method 400 begins at access step 401, where the processor 1005 determines the relationship of the observer to the input image. In particular, if the processor 1005 determines that the observer is a "first-party" to the input image, then the method 400 proceeds to step 403. Otherwise, the method 400 proceeds to step 405.

The observer of the input image is determined to be the first party to the input image, at step 401, if (s)he has a personal attachment/relation to the image or content of the input image. For example, the observer may be the photographer who captured the input image, or the observer may be the subject of the input image. As another example, the subject may be very familiar to the observer.

The inventor has determined that measured attention of observers that are first party to an image differs significantly from one of observers who were third party to the same image. Determining a visual attention map differently depending on relationship of an observer to an input image, such as the input image 1100, allows for a more accurate determination of distracting elements.

If the observer is third party to the image at step 401, then the method 400 proceeds to attention detection step 405. Step 405 is performed in the same manner as step 205 of the method 200 of FIG. 2 or step 305 of the method 300 of FIG. 3, where the low-level features and the high level features are used together with the input image to determine the visual attention map A. If the observer is first party to the input image, however, then at step 403 the processor 1005 executes a personalised attention detection step 403.

At step 403, the processor 1005 receives feedback from the observer indicating what areas of the image are of particular importance to him/her. The feedback may be provided by the user via a graphical user interface displayed on the display device 1014 and/or via text entered using the keyboard 1002. The feedback provided by the user may be stored within the memory 1006. The regions indicated by the user may then be given greater weight in attention detection function g at step 405 when determining the visual attention map A.

Alternatively, the regions indicated by the user may be determined to be ground truth (i.e., something that is taken as true). In this instance, regions indicated by the user may be deemed to be salient, regardless of the measured saliency/visual attention. The visual attention map may be configured to be identical to the ground truth.

The method 500 of identifying one or more distracting elements in an image, as executed at step 107, will now be described with reference to FIG. 5. The method 500 determines the distractor map D. The method 500 may be implemented as one or more software code modules of the software application program 1033 resident on the hard disk drive 1010 and being controlled in its execution by the processor 1005.

The method 500 begins at threshold step 501, where the processor 1005 determines a binary salient region map $S_B$ by applying a threshold operator, $\theta_S$, to the salient region map $S_T$ stored in the memory 1006. In one arrangement, a threshold value equivalent to retaining the 20% highest values of the salient region map $S_T$ is applied to the salient region map $S_T$ at step 501. The binary salient region map $S_B$ be stored within the memory 1006.

Then at threshold step 503, the processor 1005 determines a binary visual attention map $A_B$ by applying a threshold operator $\theta_A$ to the visual attention map $A_T$ stored in the memory 1006. In one arrangement, a threshold value equivalent to retaining the 20% highest values of the visual attention map $A_T$ is applied to the salient region map $A_T$ at step 503. The binary visual attention map $A_B$ may be stored within the memory 1006.

The binary salient region map $S_B$ and binary visual attention map $A_B$ are defined on a pixel basis in accordance with Equations (7), as follows:

$$S_B(x,y)=1 \text{ if } S_T(x,y) \geq \theta_S$$
$$S_B(x,y)=0 \text{ if } S_T(x,y) < \theta_S$$
$$A_B(x,y)=1 \text{ if } A_T(x,y) \geq \theta_A$$
$$A_B(x,y)=0 \text{ if } A_T(x,y) < \theta_A \quad (7)$$

At intersection step 505, the processor 1005 determines an intersection map $C_B$ representing the intersection between the binary salient region map and the inverse of the binary visual attention map (i.e., $S_B \cup \overline{A_B}$). Accordingly, the inverse of the binary visual attention map $A_B$ is intersected with the binary salient region map $S_B$ to determine the intersection map $C_B$. The intersection map $C_B$ comprises elements of the binary salient region map that are not present in the binary visual attention map. The elements of the binary salient region map Ss that are not present in the binary visual attention map $A_B$ represent distracting elements of the image. The intersection map $C_B$ may be determined in accordance with Equation (8), as follows:

$$C_B(x,y)=1 \text{ is } S_B(x,y)=1 \text{ and } A_B(x,y)=0 \text{ and } C_B=0 \text{ elsewhere} \quad (8)$$

Since the salient region detection step 103 and the attention detection step 105 are different, the boundaries of steps 103 and 105 may not be aligned, and so the intersection map $C_B$ may be approximate or incomplete. At connected component analysis step 507, the processor 1005 decomposes the intersection map $C_B$ into a series of connected components, using any suitable morphological technique, and performs connected component analysis on the series of connected components.

Letting $\Omega_l$, $l=1, \ldots, L$ represent the L connected components of the intersection map $C_B$. For each connected component $\Omega_l$, the processor 1005 analyses a corresponding connected component $\Omega_l^S$ in the binary salient region map $S_B$. If $\Omega_l^S \cap A_B \neq \phi \forall x,y \in \Omega_l^S$, then $[C_B(x,y \in \Omega]_l)=0$. That is, if the intersection of the entire connected component of the binary salient region map $S_B$ with the binary visual attention map $A_B$ is not empty, then the value of the intersection map $C_B$ for the relevant pixels is set to zero. Further, if the intersection of the entire connected component of the binary salient region map $S_B$ with the binary visual attention map $A_B$ is empty, then the processor 1005 sets $C_B(x,y \in \Omega_l^S)=1$ Such analysis is repeated for the L connected components of the intersection map $C_B$ to determine distractor map $D_B$ where the distractor map $D_B$ is equal to the intersection map $C_B$ at the end of the connected component analysis.

In an alternative arrangement, step 507 is not performed in the method 500. In this instance, the output of step 505 (i.e., the intersection map $C_B$) is considered to be the distractor map $D_B$.

Figure 6:
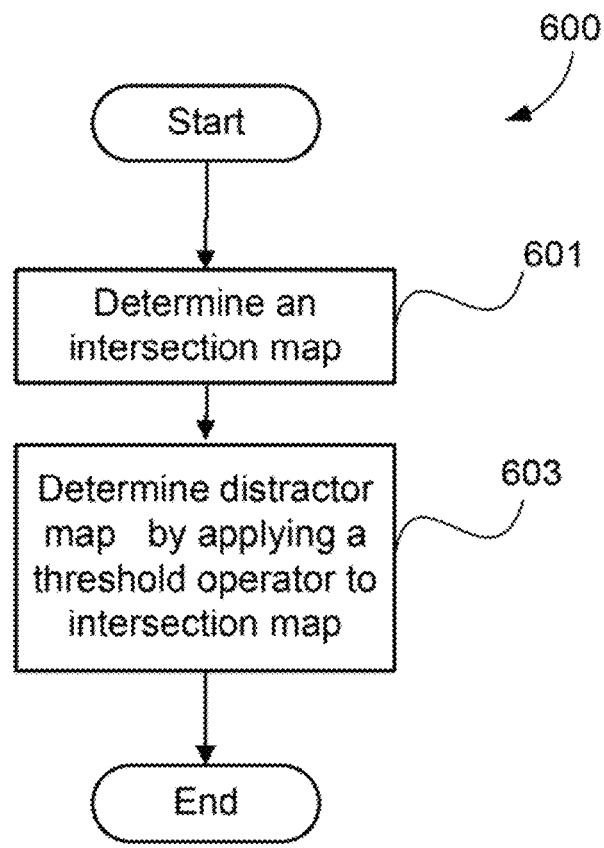
FIG. 6 is a flow diagram showing a further alternative method of identifying one or more distracting elements in an image, as executed in the method of FIG. 1.

A further alternative method 600 of identifying one or more distracting elements in an image, as executed at step 107, will be described in detail below with reference to FIG. 6. The method 600 may be implemented as one or more software code modules of the software application program 1033 resident on the hard disk drive 1010 and being controlled in its execution by the processor 1005.

At intersection step 601, the processor 1005 determines an intersection map $C_B$ by applying an intersection function to continuous, non-thresholded salient map $S_T$ and the inverse of the visual attention map $A_T$. The intersection map Cs may be stored in memory 1006. For example, an intersection function in accordance with Equation (9), below, may be applied to salient map $S_T$ and visual attention map $A_T$, where the multiplication is performed on a per-pixel basis:

$$C=S_T \cdot (1-A_T) \quad (9).$$

Then at threshold step 603, the processor 1005 determines distractor map by applying a threshold operator to intersection map $C_B$ stored in the memory 1006. In one arrangement, a threshold value equivalent to retaining the 20% highest values of the intersection map $C_B$ and setting the 20% highest values of the intersection map $C_B$ to one (1), while setting the remaining values of the intersection map $C_B$ to zero (0).

Figure 7:
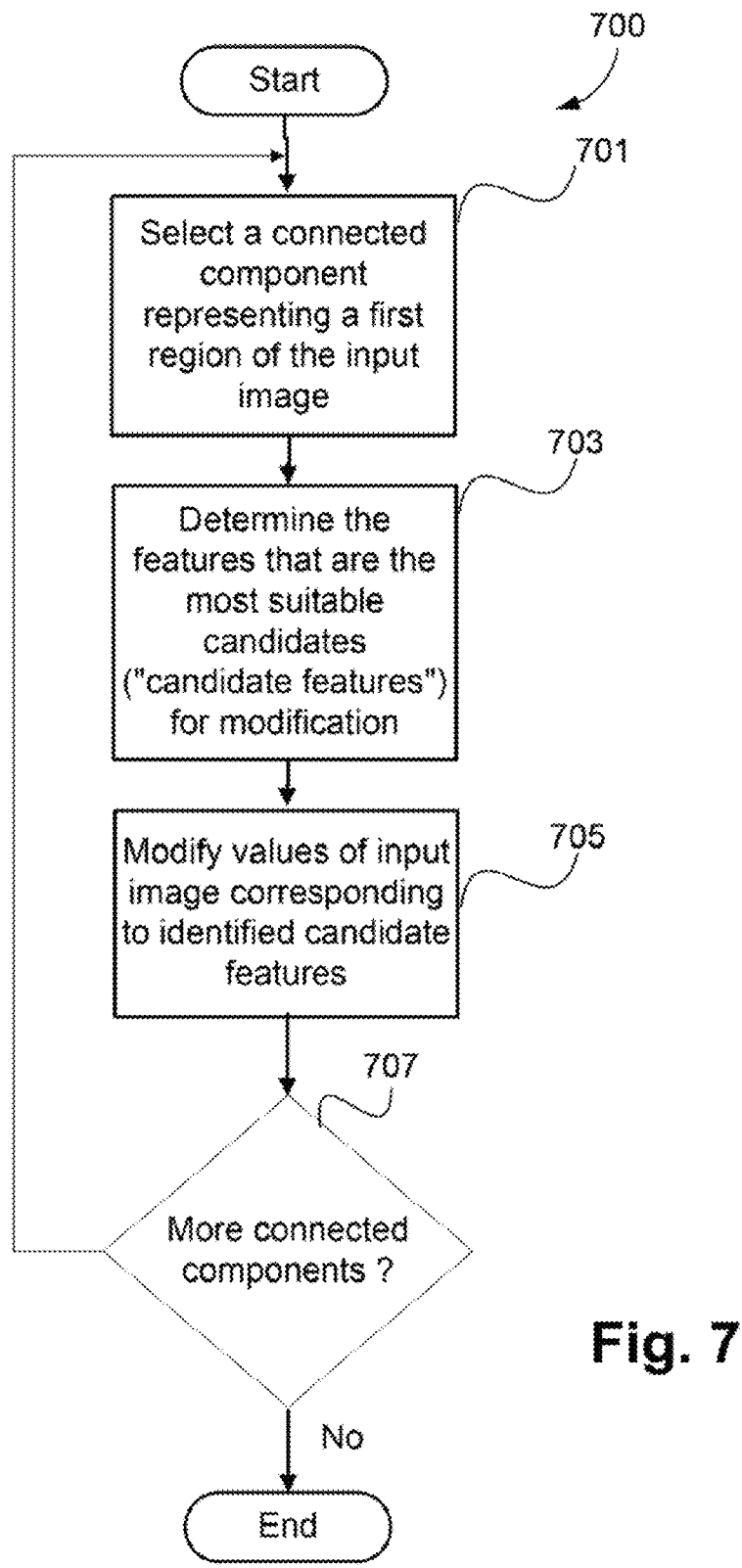
FIG. 7 is a flow diagram showing a method of attenuating saliency of regions (or distracting elements) of an input image, as executed in the method of FIG. 1.

A method 700 of attenuating saliency of regions of an input image, as executed at step 109, will now be described with reference to FIG. 7. The method 700 may be implemented as one or more software code modules of the software application program 1033 resident on the hard disk drive 1010 and being controlled in its execution by the processor 1005.

Figure 5:
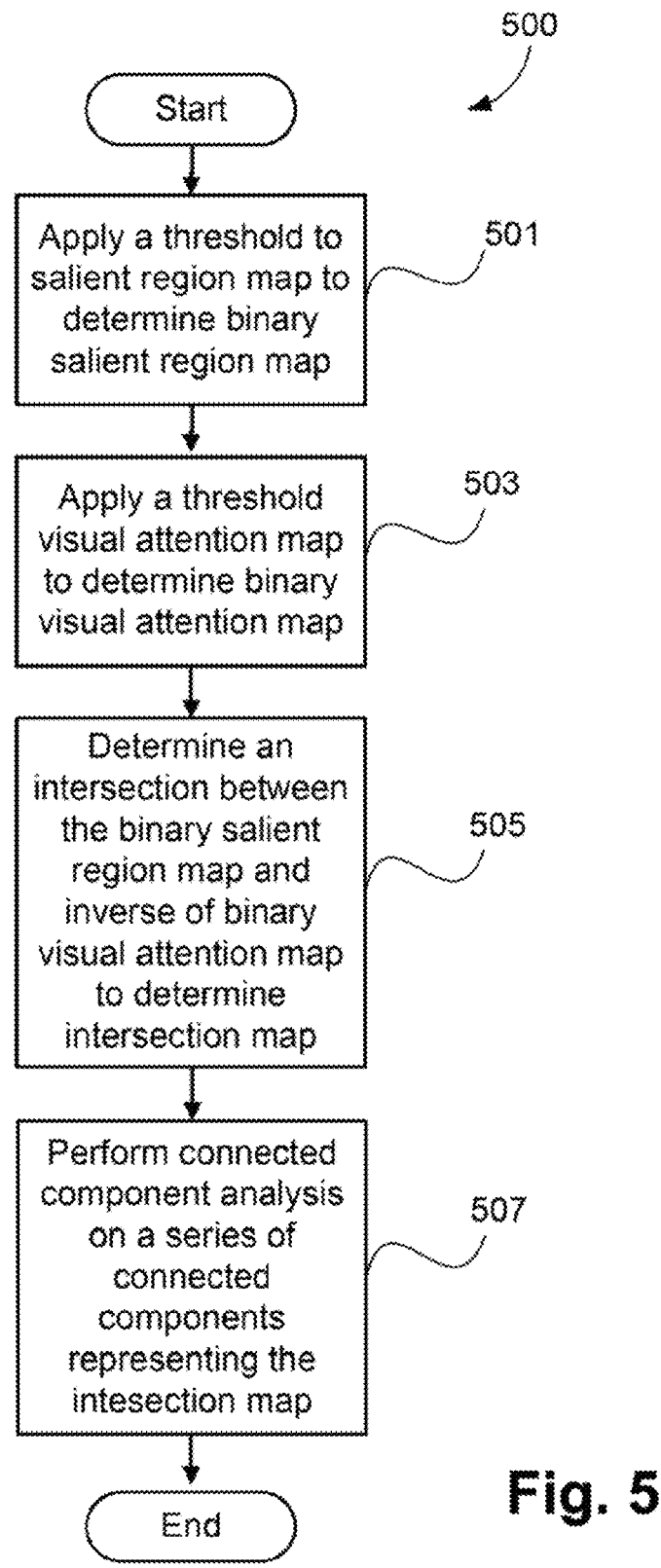
FIG. 5 is a flow diagram showing a method of identifying one or more distracting elements in an image, as executed in the method of FIG. 1.

As described above, the distractor map D is composed of connected components $\Omega_l$, identified for example in the connected component analysis step 507 of FIG. 5. Each of the connected components $\Omega_l$ represents a region of the input image.

The method 700 begins at selection step 701, where the processor 1005 selects a connected component $\Omega_l$ representing a first region of the input image.

Then at identifying step 703, the processor 1005 determines features $\xi_i$ that are most suitable candidates ("candidate features") for modification. The determination at step 703 is based on the output of the function $f$ in the salient region detection step 103. The features that contribute the most to the output of the function $f$ in the considered connected component $\Omega_l$ are identified as being candidates for modification.

Once the candidate features have been identified, values of the input image I corresponding to the identified candidate features are modified by the processor 1005 at modification step 705 so as to minimise saliency of the candidate features. Minimising saliency of the candidate features attenuates the saliency of the region corresponding to the connected component $\Omega_l$ selected at step 701.

If there are w candidate features $\xi_p$, $p=1, \ldots, w$. In particular, at step 705, the processor 1005 determines feature values $\hat{\xi}_p$ such that $f(\hat{\xi}_p, \ldots) < \epsilon$ where $\epsilon$ is a threshold greater than zero (0) and smaller than a previously determined value. In one arrangement, $\epsilon=0.1$.

A value of $\epsilon=0$ attenuates perceived distracting elements by setting the connected component $\Omega_l$ and the corresponding region of the input image I to a corresponding boundary value. While setting the connected component $\Omega_l$ to a corresponding boundary value may be suitable at times, such a modification may be too strong and may decrease perceived quality of the input image.

The feature values $\hat{\xi}_p$ may be determined either iteratively by sampling $\xi_p$ along possible values and estimating the function $f$ at every sample. Alternatively, the feature values $\hat{\xi}_p$ may be determined analytically by considering the analytical model for the function $f$, such as the analytical model from Equation (2) and the objective minimisation function with as the objective. The feature values $\hat{\xi}_p$ may be determined analytically using any suitable method such as gradient descent, Gaussian elimination, simplex, max-cut min-flow, or multivariate regression analysis.

At decision step 707, if there are more connected components of the distractor map D to be processed, then the method 700 returns to step 701 where a next connected component $\Omega_2$, representing a further region of input image I, is selected. Otherwise, the method 700 concludes.

The image $\hat{I}$ whose feature representation is the feature values $\hat{\xi}_p$ for the candidate features and feature $\xi_i$ for all other features (i.e., with i being different from p) is the output image. The output image is a distractor-free or attenuated, enhanced version of the input image I.

Figure 8:
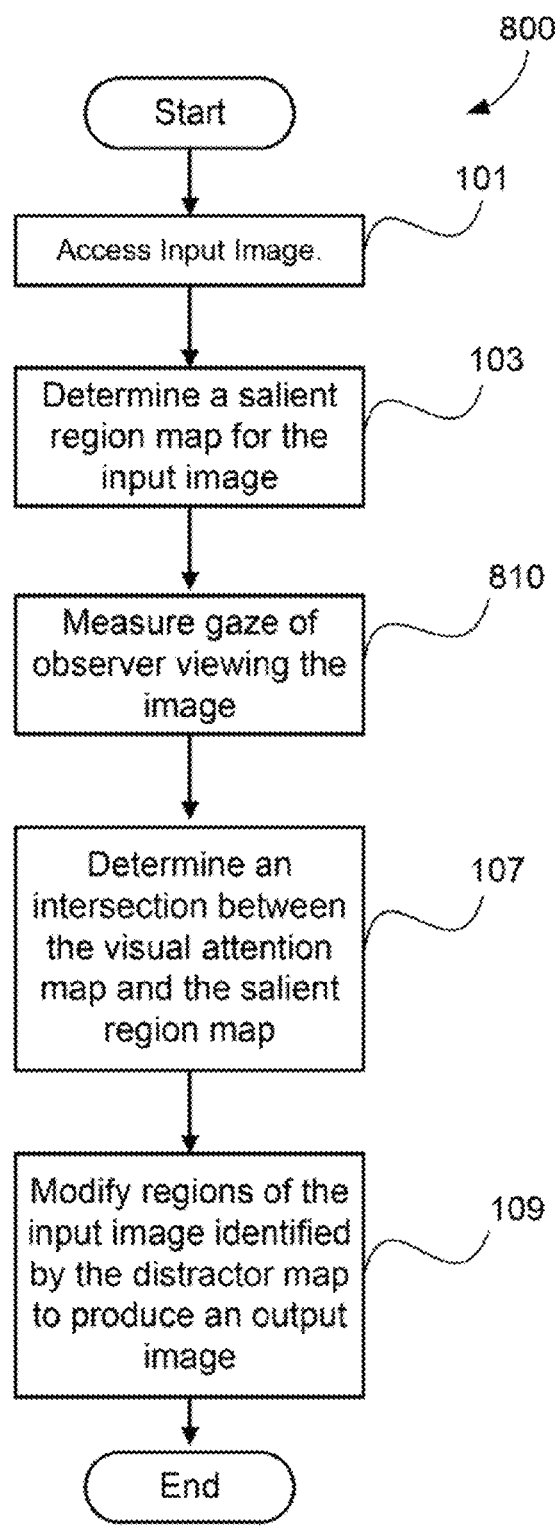
FIG. 8 is a flow diagram showing an alternative method of modifying an image.

FIG. 8 shows an alternative method 800 of modifying an image. The method 800 may be implemented as one or more software code modules of the software application program 1033 resident on the hard disk drive 1010 and being controlled in its execution by the processor 1005.

As seen in FIG. 8, the method 800 is similar to the method 100. In accordance with the method 800, the input image I is processed in accordance with salient region detection step 103 to produce a salient region map S, as described above.

However, rather than executing step 105, a gaze measuring step 810 is performed. At step 810, the input image I is displayed by the processor 1005, on a screen of the display device 1014. In one alternative arrangement, the input image is presented to the user in a hardcopy form.

The displayed image is configured to be viewed by an observer. The observer may be a first ($1^{st}$) or third ($3^{rd}$) party to the input image. Also at step 810, gaze of the observer viewing the displayed image is measured by the processor 1005. Any suitable method may be used by the processor 1005 to measure the gaze of the observer. For example, eye-tracking equipment may be used in gaze-tracking step 810. A visual attention map A may be determined using such eye tracking. In particular, the measured gaze may be used to form a measured visual attention map, which may also be considered as a probability distribution, in a similar manner to the visual attention map A described above. Similarly, the salient region map may be determined using eye tracking.

The measured attention map determined at step 810 and salient region map S are processed in accordance with the distractor identification step 107 to form a distractor map D. Then at step 109, the processor 1005 selectively modifies regions of the input image identified by the distractor map D determined at step 107 using the measured visual attention map and the distracting elements are attenuated in accordance with step 109 to form the output image. The method 800 effectively modifies the input image so that saliency of regions of the input image match ground truth obtained on an observer.

Figure 9:
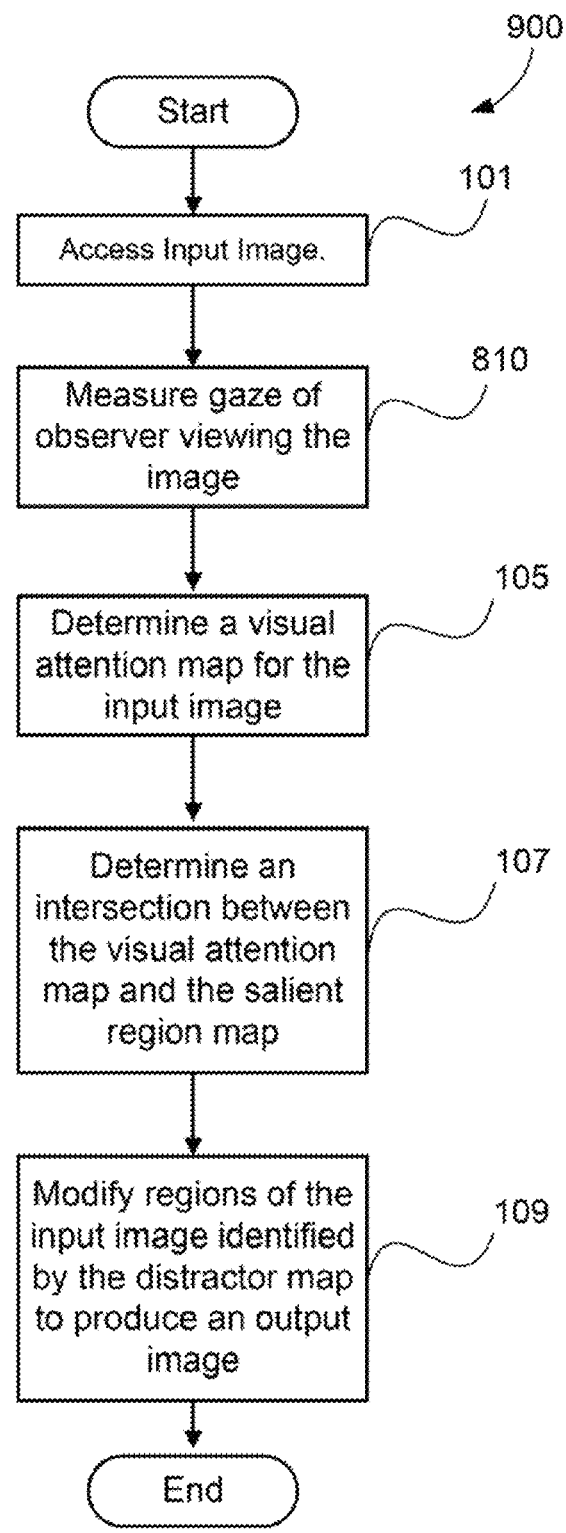
FIG. 9 is a flow diagram showing another alternative method of modifying an image.

FIG. 9 shows another alternative method 900 of modifying an image. The method 900 may be implemented as one or more software code modules of the software application program 1033 resident on the hard disk drive 1010 and being controlled in its execution by the processor 1005.

As seen in FIG. 9, the method 900 is similar to the method 100. However, in the event of the observer being a first party to the input image, the salient region detection step 103 may be replaced by the attention detection step 105. Accordingly, at step 105, the processor 1005 determines a visual attention map A in a similar manner to the method 100. The method 900 also comprises gaze measuring step 810, where the input image I is displayed by the processor 1005, or presented in hard copy form, and the gaze of the observer is measured. Further, in accordance with the method 900 of FIG. 9, at the distractor attenuation step 109, the processor 1005 selectively modifies regions of the input image, identified by the distractor map D, to produce an output image whose visual attention matches the visual attention of the first party observer whose gaze has been measured at step 810. The method 900 ensures that third ($3^{rd}$) party viewers to the output image see the image as the image was intended to be seen by the first ($1^{st}$) party observer who is typically the photographer.

The method 100 will now be further described by way of example with reference to FIGS. 11A to 11E. As described above, FIG. 11A shows a sketched example of an input image 1100. The image 1100 contains a plurality of regions representing a dog 1101, a flower 1102 and an insect 1103 on a grey background 1104. In accordance with the example of FIG. 11A, at salient detection step 103 the processor 1005 uses three low-level features: CIE L*, a*, and b*. Scale properties $\Gamma_c$ and $\Gamma_s$ are selected to be a Gaussian with a mean of six (6) degrees of subtended visual angle and thirty (30) degrees of subtended visual angle (i.e., the entire image), respectively.

At visual attention step 105, the processor 1005 employs, in addition to the low-level features described above (e.g., colour, luminance, sharpness, size, texture and orientation), high-level features including face detection and position. For example, an object close to the centre of the image is more likely to be the subject of the image than an object lying in a corner. The weight given to the features are 0.3, 0.1, 0.1, 0.7, 0.3 for each of L*, a*, b*, face detection and position, respectively. In the present example, scale parameters used at step 105 are the same as for the salient region detection step 103.

Properties of various regions of the image 100 are described as follows:

Background 1104: L=60, a=0, b=0, proba(face)=0, position=0, size=30 degrees.
Insect 1103: L=20, a=30, b=30, proba(face)=0, position=0, size=1 degree
Flower 1102: L=50, a=50, b=0, proba(face)=0, position=0.2, size=4 degrees
Dog (head) 1101: L=30, a=20, b=10, proba(face)=0.9, position=0.8, size=6 degrees
Dog (body) 1101: L=30, a=20, b=10, proba(face)=0.1, position=0.8, size=10 degrees The face and position features may be expressed in terms of probability output of a face and position detector, which is customary for such features.

FIG. 11B shows the salient region map S 1110 determined for the image 1100 in accordance with step 103. As seen in FIG. 11B, the flower 1102 and the dog 1101, (i.e., face and body) are detected as salient due to differences in CIELab values for elements 1101, 1102 and 1103 of the image 1100 compared to the background 1104, in accordance with Equation (2). The insect 1103 is not detected as salient due to the small size of the insect 1103.

FIG. 11C shows visual attention map A 1120, determined for the image 1100 in accordance with step 105. As seen in FIG. 11C, only the head of the dog 1104 is detected.

FIG. 11D shows the distractor map 1130, determined for the image 1100 using the salient region map S 1110 and the visual attention map A 1120, in accordance with step 107. The intersection between the salient region map S 1110 and the inverse of the visual attention map A 1120 is determined in accordance with the method 500 of FIG. 5.

Since the intersection between the head of the dog 1101 detected in the visual attention map A 1120 and the head and body of the dog 1101 detected in the salient region map S 1110 is non-null. At the connected component analysis step 507, the processor 1005 considers the region covered by the dog 1101 as a non-distracting element. The region covered by the flower 1102, on the other hand, is only present in the salient region map S 1110. However, the region covered by the flower 1102 and is not in the visual attention map A 1120.

Accordingly, the flower 1102 is identified as a distracting element and is present in the distractor map 1130.

FIG. 11E shows an output image 1140 determined for the input image 1100 in accordance with step 109 of the method 100. In accordance with the example of FIGS. 11A to 11E, a largest feature contributing to the identification of the region covered by the flower 1102 as a salient region is the CIE a* value of the image 1100. The difference in the CIE a* value between the flower 1102 and a neighbouring region (i.e., the background 1104), is equal to fifty (50). A second largest contributing feature to the saliency of the region covered by the flower 1102 is CIE L*. The difference in the CIE L* value between the region covered by the flower 1102 and a neighbouring region (i.e., the background 1104) is ten (10). The difference between the largest contributing feature and the region covered by the flower 1102 is thus capped at ten (10). The CIE Lab values corresponding to the region covered by the flower 1102 are modified in accordance with the distractor attenuation step 109 to L*=50 (i.e., no change), a*=10, and b*=0 (i.e., no change), making the region covered by the flower 1102 (i.e., the distractor region) much less conspicuous and therefore improving the perceived quality of the image 1100.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of identifying a distracting element in an image, said method comprising:
    determining a visual attention map for the image, said visual attention map representing one or more regions of the image, at least one of said regions corresponding to at least a portion of a subject of the image;
    determining a salient region map for the image, said salient region map comprising a distribution of visual attraction values defining one or more further regions of the image, said one or more further regions being categorised as salient; and
    identifying a distracting element in said image based on the visual attention map and the salient region map, wherein said distracting element corresponds to at least one of the salient regions.

2. The method according to claim 1, wherein the distracting element is identified by determining an intersection between the visual attention map and the salient region map.

3. The method according to claim 1, wherein the regions represented by the visual attention map depend on content of the image.

4. The method according to claim 1, wherein the regions represented by the visual attention map correspond to high-level features of the image.

5. The method according to claim 1, wherein the regions represented by the visual attention map depend on an intended observer of the image.

6. The method according to claim 1, wherein an inverse of the visual attention map is intersected with the salient region map to determine the intersection.

7. The method according to claim 1, wherein the salient region map and the visual attention map are binary.

8. The method according to claim 1, further comprising performing a connected component analysis on the intersection.

9. The method according to claim 1, wherein the visual attention map is determined using eye tracking.

10. The method according to claim 1, wherein the salient region map is determined using eye tracking.

11. An apparatus for identifying a distracting element in an image, said apparatus comprising:
    means for determining a visual attention map for the image, said visual attention map representing one or more regions of the image, at least one of said regions corresponding to at least a portion of a subject of the image;
    means for determining a salient region map for the image, said salient region map comprising a distribution of visual attraction values defining one or more further regions of the image, said one or more further regions being categorised as salient; and
    means for identifying a distracting element in said image based on the visual attention map and the salient region map, wherein said distracting element corresponds to at least one of the salient regions.

12. A system for identifying a distracting element in an image, said system comprising:
    a memory for storing data and a computer program;
    a processor coupled to said memory for executing said computer program, said computer program comprising instructions for:
        determining a visual attention map for the image, said visual attention map representing one or more regions of the image, at least one of said regions corresponding to at least a portion of a subject of the image;
        determining a salient region map for the image, said salient region map comprising a distribution of visual attraction values defining one or more further regions of the image, said one or more further regions being categorised as salient; and
        identifying a distracting element in said image based on the visual attention map and the salient region map, wherein said distracting element corresponds to at least one of the salient regions.

13. A non-transitory computer readable medium having recorded thereon a computer program for identifying a distracting element in an image, said program comprising:
    code for determining a visual attention map for the image, said visual attention map representing one or more regions of the image, at least one of said regions corresponding to at least a portion of a subject of the image;
    code for determining a salient region map for the image, said salient region map comprising a distribution of visual attraction values defining one or more further regions of the image, said one or more further regions being categorised as salient; and
    code for identifying a distracting element in said image based on the visual attention map and the salient region map, wherein said distracting element corresponds to at least one of the salient regions.

* * * * *